(12) United States Patent
Szor (10) Patent No.: US 7,665,136 B1
(45) Date of Patent: Feb. 16, 2010

(54) METHOD AND APPARATUS FOR DETECTING HIDDEN NETWORK COMMUNICATION CHANNELS OF ROOTKIT TOOLS

(75) Inventor: Peter Szor, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 827 days.

(21) Appl. No.: 11/271,327

(22) Filed: Nov. 9, 2005

(51) Int. Cl.
*G06F 12/14* (2006.01)
*G06F 11/00* (2006.01)

(52) U.S. Cl. .............. 726/22; 726/23; 726/24; 726/25; 713/188; 709/220; 709/223; 709/227; 709/238

(58) Field of Classification Search ............. 726/22
See application file for complete search history.

(56) References Cited

U.S. PATENT DOCUMENTS

| | | | |
|---|---|---|---|
| 7,058,968 B2* | 6/2006 | Rowland et al. ............. | 726/1 |
| 7,571,482 B2* | 8/2009 | Polyakov et al. ............ | 726/24 |
| 2004/0117478 A1* | 6/2004 | Triulzi et al. ............... | 709/224 |
| 2005/0229250 A1* | 10/2005 | Ring et al. .................. | 726/23 |
| 2006/0031673 A1* | 2/2006 | Beck et al. ................. | 713/164 |
| 2007/0079178 A1* | 4/2007 | Gassoway .................. | 714/38 |
| 2007/0079373 A1* | 4/2007 | Gassoway .................. | 726/22 |

OTHER PUBLICATIONS

Keong, T.C., 'Defeating Kernel Native API Hookers by Direct Service Dispatch Table Restoration', Special Interest Group in Security and Information Integrity (SIGA2), Oct. 3, 2004, entire document, http://www.security.org.sg/code/SIG2_DefeatingNativeAPIHookers.pdf.*
Yin, H., et al, "Panorama: Capturing System-wide Information Flow for Malware Detection and Analysis", CCS'07, Oct. 29-Nov. 2, 2007, Copyright 2007 ACM 978-1-59593-703-02/07/0011, entire document, http://bitblaze.cs.berkeley.edu/papers/panorama.pdf.*
Szor, P., "The Art of Computer Virus Research and Defense", 2005, Addison-Wesley, pp. 425-436.

* cited by examiner

*Primary Examiner*—Kambiz Zand
*Assistant Examiner*—Ronald Baum
(74) *Attorney, Agent, or Firm*—Gunnison, McKay & Hodgson, L.L.P.; Forrest Gunnison (57) ABSTRACT

Methods and apparatuses for detecting hidden network channels of rootkit tools are described. In one embodiment, critical endpoint events detected at an endpoint computer system are selectively logged to an endpoint database. Also, critical network events associated with the endpoint computer system and detected on a network are selectively logged to a gateway database. Periodically some or all of the entries in the endpoint database are compared to entries in the gateway database. Entries detected at the network but not detected at the endpoint computer system are presumed indicative of hidden network channels of rootkit tools.

14 Claims, 4 Drawing Sheets

METHOD AND APPARATUS FOR DETECTING HIDDEN NETWORK COMMUNICATION CHANNELS OF ROOTKIT TOOLS

BACKGROUND OF THE INVENTION

1. Field of the Invention

The present invention relates to the protection of computer systems. More particularly, the present invention relates to a method and apparatus for detecting hidden network communication channels of rootkits on a computer system.

2. Description of Related Art

A rootkit can be generally described as a set of programs or codes that allows the rootkit itself, and typically some additional programs or codes, to maintain an undetectable presence on a computer. As a rootkit is typically undetected by a user of a computer system, rootkits are typically categorized as malicious code.

Current computer system attackers use a variety of rootkit implementations to hide their activities on a computer system. When an attacker compromises a computer system, the rootkit typically maintains an access point into the computer system, e.g., a backdoor, that can be used to access the computer system and to pull discovered information out over a hidden communication channel.

To ensure its activity and access point remains available, the rootkit typically hides its presence on the computer system. For example, some rootkits hide their files and processes, erase their activity, and alter information returned to a user or the computer system to conceal their presence on the computer system. Together with file related events rootkits also hide network ports, network connections and network related events.

SUMMARY OF THE INVENTION

According to one embodiment of the invention, critical endpoint events detected at an endpoint computer system are selectively logged as entries to an endpoint database. Also, critical network events associated with the endpoint computer system and detected on a network are selectively logged as entries to a gateway database. Periodically some or all of the entries in the endpoint database are compared to entries in the gateway database. Entries detected at the network but not detected at the endpoint computer system are presumed indicative of hidden network channels of rootkit tools.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Typically a communication port on a computer system is an endpoint of a communication channel over which information, i.e., traffic, is communicated to and/or from the computer system. A communication port, herein also termed port, is associated with a particular service on a computer system, such as an application, which supports the traffic utilizing the port. For example, port 80 traffic is conventionally associated with HTTP (Hyper Text Transfer Protocol) traffic. Other ports can also be established by applications on the computer system.

Conventionally, an IP (Internet Protocol) address is assigned to a computer system and is used to identify the computer system. Additionally, as there can be many ports on a computer system, a port number is assigned to each port and is used to identify the port on the computer system. The port number together with the IP address of the computer system is generally referred to as the port address.

IP network traffic is typically communicated over one or more networks as one or more data packets, each of which contain a network header used in routing the data packet. The network header typically includes fields that specify a source port address, a destination port address, and type of protocol, such as TCP (Transmission Control Protocol), UDP (User Datagram Protocol), or ICMP (Internet Control Message Protocol). For example, a network header of an ICMP message typically includes a field specifying a protocol value of 1, indicating the ICMP protocol.

The source port address typically specifies the IP address and port number associated with a source port, and the destination port address typically specifies the IP address and port number associated with a destination port. As earlier described, in order to route a data packet to an associated service of a port, the data packet needs to be addressed to the port and then through that port the associated service monitors the particular port's traffic.

Windows-based operating systems provide a programming API (Application Program Interface) that provides applications access to operating system functions that handle input/output requests on the network called the Winsock (Windows Socket) API. Conventionally, applications interface to Winsock functions in the operating system kernel through a Winsock API dll (dynamic link library), such as Ws2_32.dll.

Windows executable files and DLLs are conventionally formatted in accordance with the PE (Portable Executable) file format. Frequently executable applications include an IAT (Import Address Table) to access Winsock functions callable through the Winsock API. The IAT holds file-relative offsets to the names of imported functions referenced in the executable application's code. Thus, when Windows loads the executable application into memory, Windows patches the offsets with the correct address of the imported functions, e.g., the correct addresses of the various Winsock API functions. Examples of Winsock functions supported in the Winsock API are the LISTEN function and the SEND function.

When a port is established on a computer system, the port and events related to the port are typically detectable by the computer system, such as by an open port query. Differently, when a port is established by malicious code, such as a rootkit, the port and events related to the port are generally hidden and not detected by the computer system on which the port is established. Thus, an open port query by the operating system of the computer system would not show the hidden port.

For example, an attacker's rootkit can establish a port on a computer system, such as a hidden port, and associate the hidden port with an executable application of the rootkit that keeps the port open. The executable application, or other rootkit code, waits and listens for network communications addressed to the hidden port from an attacker's computer system. In this way, the rootkit establishes a hidden communication channel with the attacker's computer system over the hidden port permitting the attacker to connect back to the computer system. When the attacker connects to the compromised computer system through the hidden port, e.g., the backdoor, the attacker can send commands and/or pull desired data from the compromised computer system.

While a rootkit typically hides the port and port related events from the detection by the compromised computer system, in order for a port connection to occur, communications with the hidden port need to be routed over the network. Thus, typically the communications with the hidden port need to be visible to network entities, such as routers, servers, and other network traffic gateways.

As earlier discussed, some attackers use rootkits to open up a communication path to a compromised computer system and then an attacker connects back to obtain information. Differently, some attackers utilize rootkits to access a computer system and then send information out from the compromised computer system without having to connect back. In particular, some attackers utilize ICMP messages to send information from a compromised computer system to another location, such as an attacker's computer system.

ICMP is an extension of the Internet Protocol and is generally used for debugging, error control, and informational messages. In typical networks there can be a large amount of ICMP messages traversing the networks between computer systems.

As ICMP is not a standard communication path used in regular communications, attackers assume that ICMP communications are typically not viewed as suspicious communications. Thus, one technique some attackers use is to hide small amounts of information within ICMP messages that, when received by an attacker, can be used to convey information, such as a file or password, obtained from a compromised computer system.

Currently there is an application called LOKI which attackers can use against LINUX-based systems to communicate with another computer system, e.g., an attacker's computer system, using ICMP and avoid detection at the compromised computer system. Typically, an executable application needs to access the Winsock SEND function in order to send the ICMP message. As earlier described, a field in the network header of the data packet identifies the message as an ICMP message.

Thus, if a rootkit compromises a computer system and hides the sending of ICMP messages, the ICMP messages would not be detected by the compromised computer system. However, in order for the ICMP message to be routed over the network, the communication needs to be visible to network entities, such as routers, servers, and other network traffic gateways.

Viewed generally, embodiments in accordance with the invention log selected events detected on an endpoint computer system and selected events detected on a network to which the endpoint computer system is connected. Periodically the events detected on the network are compared with the events detected on the endpoint computer system. When a selected event is detected on the network, but not on the endpoint computer system, that event is determined to be indicative of a hidden communication channel, such as a hidden communication channel established by a rootkit.

Herein, in one embodiment a rootkit is a set of programs or codes that allows the rootkit itself, and typically some additional programs or codes, to maintain an undetectable presence on a computer. Herein a rootkit is defined as malicious code. Further, herein, in one embodiment, malicious code is defined as any computer program, module, set of modules, or code that enters a computer system environment without an authorized user's knowledge and/or without an authorized user's consent.

Figure 2:
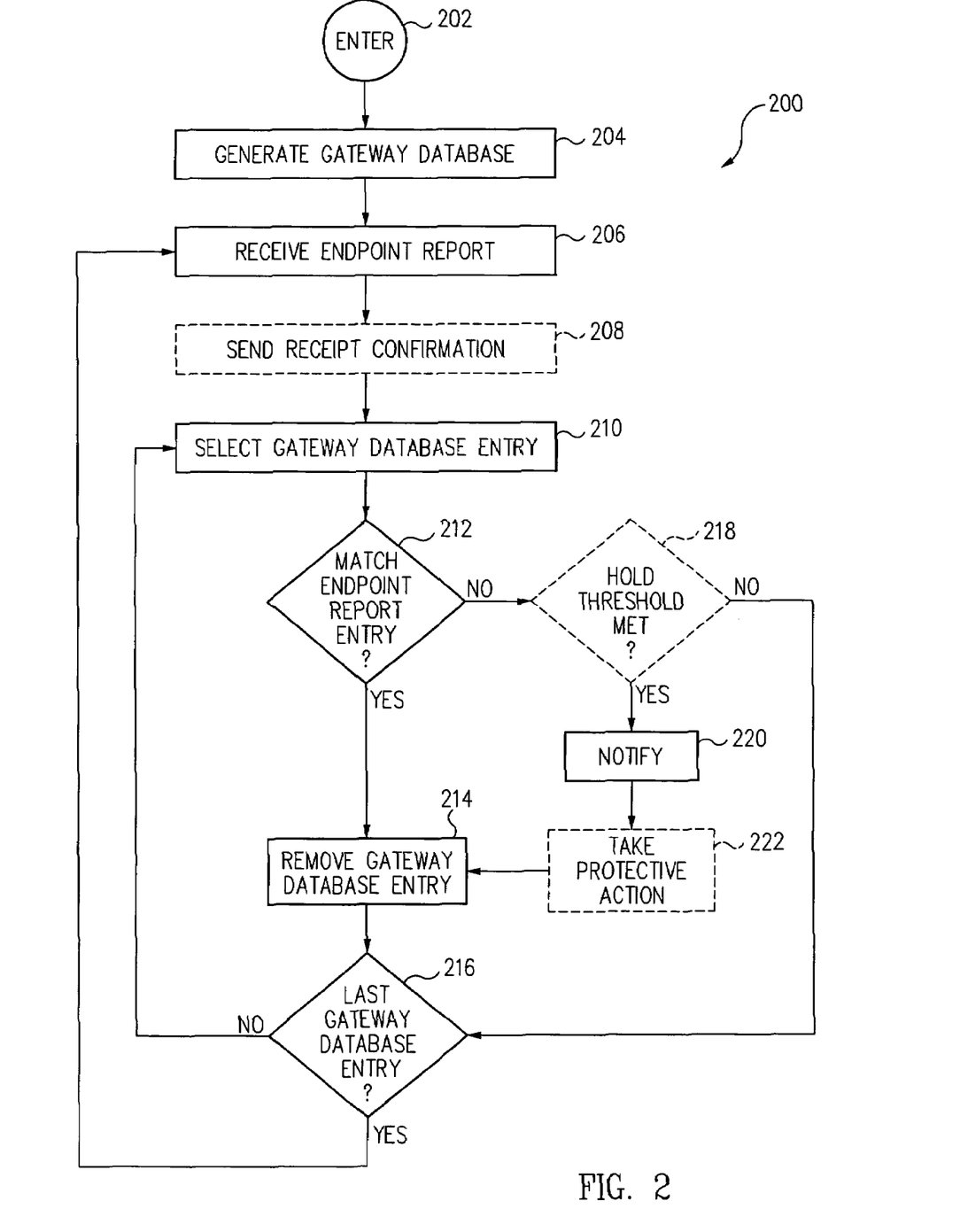
FIG. 2 illustrates a flow diagram of a method for detecting hidden rootkit communication channels in accordance with one embodiment of the invention.

Referring generally to FIG. 2, in one embodiment, critical network events detected on a network at a gateway computer system, such as a server or router, are logged as entries to a gateway database (operation 204). Periodically, an endpoint report is received at the gateway computer system that includes entries of critical endpoint events detected on an endpoint computer system on the network (operation 206). In one embodiment, the endpoint report includes some or all of the entries in an endpoint database. Optionally, receipt of the endpoint report is returned to the sending endpoint computer system (operation 208) permitting critical endpoint events that were sent in the endpoint report to be removed from the endpoint database.

Entries in the gateway database are compared with entries in the endpoint report to determine whether there are critical network events associated with the endpoint computer system that are detected on the network but not detected at the endpoint computer system (operations 210 and 212). When an entry in the gateway database corresponds to, e.g., matches, an entry in the endpoint report, the associated communication channel is not a hidden communication channel, and the entry in the gateway database is removed from the gateway database (operation 214).

However, when an entry in the gateway database does not correspond to, e.g., does not match, an entry in the endpoint report, the entry in the gateway database is determined to be indicative of a rootkit hidden communication channel, and a notification is generated (operation 220) advising of the detection. In some embodiments, protective action(s) are taken (operation 222), such as diagnostically evaluating the endpoint computer system for malicious code, i.e., a rootkit, or copying the entry for later security analysis. The comparison is repeated with a next entry in the gateway database until each entry in the gateway database has been compared (operation 216).

Optionally, in one embodiment, when an entry in the gateway database does not correspond to an entry in the endpoint report, the entry is retained in the gateway database until it corresponds to an entry in a subsequent endpoint report and is removed (operation 214), or until a hold threshold is met (operation 218). When the hold threshold is met, the entry in the gateway database is determined to be indicative of a rootkit hidden communication channel.

Embodiments in accordance with the invention are described herein with reference to a Windows operating system, such as Windows NT/2000/XP; however, those of skill in the art can recognize that embodiments in accordance with the present invention are applicable to other operating systems as well. Herein a call includes code used to invoke a function. A call specifies the function to invoke, and optionally includes parameters associated with the call.

Figure 1:
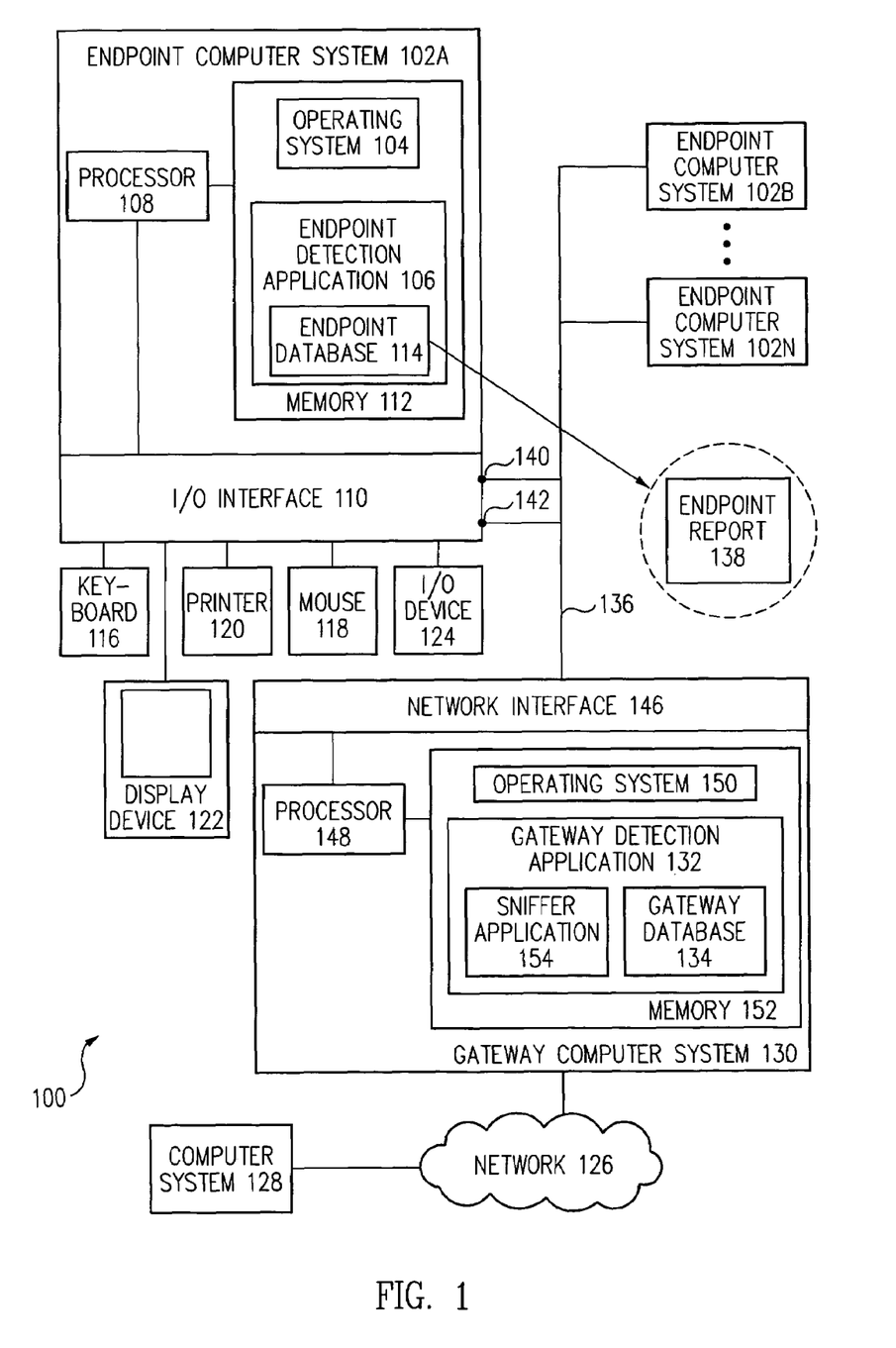
FIG. 1 is a diagram of a computer system including an endpoint detection application executing on one or more endpoint computer systems and a gateway detection application executing on a gateway computer system in accordance with one embodiment of the invention.

FIG. 1 is a diagram of a computer system 100 that includes gateway detection application 132 executing on a gateway computer system 130 and an endpoint detection application 106 executing on an endpoint computer system 102A in accordance with one embodiment of the invention. Referring to FIG. 1, endpoint computer system 102A, sometimes called a client or user device, typically includes a central processing unit (CPU) 108, hereinafter processor 108, an input/output (I/O) interface 110, and a memory 112. In one embodiment, memory 112 includes an operating system 104 such as a page based virtual memory system for example, Windows NT/2000/XP.

Endpoint computer system 102A may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from computer system 102A. In one embodiment, endpoint detection application 106 is loaded into endpoint computer system 102A via I/O device 124, such as from a CD, DVD or floppy disk containing endpoint detection application 106. In one embodiment, endpoint detection application 106 is typically stored in memory 112 of endpoint computer system 102A and executed on endpoint computer system 102A.

In FIG. 1, endpoint computer system 102A is coupled to gateway computer system 130 by network 136. In the present embodiment, communication between endpoint computer system 102A and network 136 occurs over one or more ports, e.g., port 140 and port 142. In the present illustration, port 140 represents a port established by a non-malicious application. Port 140 and events related to port 140 are detectable by endpoint computer system 102A.

For purposes of description, port 142 represents a hidden port established by a malicious application, such as a rootkit. Port 142 and events related to port 142 are hidden and not detectable by endpoint computer system 102A. Thus, as illustrated, a communication channel is established on network 136 over port 142, such as to an attacker's computer system, such as computer system 128, that is not detected on endpoint computer system 102A.

In the present illustration, network 136 further includes other computer systems, such as endpoint computer systems 102B-102N that are also coupled to gateway computer system 130 by network 136. The particular type of and configuration of network 136 and endpoint computer systems 102A-102N are not essential to this embodiment of the present invention.

In the present embodiment, endpoint detection application 106 is installed and executing on endpoint computer systems 102B-102N. Herein, for purposes of clarity, the description of the present invention with reference to endpoint computer systems 102A-102N is described with reference to endpoint computer system 102A. It can be understood, however, that the description with reference to endpoint computer system 102A is applicable to endpoint computer systems 102B-102N as well.

In one embodiment, gateway system 130 is a server computer system and/or network router that controls communications on network 136 and interfaces between network 136 and computer systems outside network 136, such as with computer system 128 via a network 126. Gateway computer system 130 includes, but is not limited to: an operating system, e.g., operating system 150; a processor, e.g., processor 148; one or more memories, e.g., memory 152; input/output interfaces, including network interfaces, e.g. network interface 146; as well as input/output devices, such as a display, a keyboard, a mouse, a floppy disc drive, and a CD-ROM drive (not shown). In one embodiment of the invention, gateway detection application 132 is typically stored in a memory, e.g., memory 152, of gateway computer system 130 and executed by a processor, e.g., processor 148, of gateway computer system 130.

In various embodiments, network interfaces of gateway computer system 130, e.g., network interface 146, and I/O interface 110 of endpoint computer system 102A include analog modems, digital modems, or a network interface card. Further, networks 136 and 126 are any network or network system that is of interest to a user.

In one embodiment, computer system 128 is a computer system utilized by an attacker to establish a hidden communication channel to endpoint computer system 102A over a hidden port, e.g., port 142, established by a rootkit (not shown) on endpoint computer system 102A. Computer system 128 can be similar to endpoint computer system 102A and, for example, can include a central processing unit, an input output (I/O) interface, and a memory.

Computer system 128 may further include standard devices like a keyboard, a mouse, a printer, a display device and an I/O device(s). The various hardware components of computer system 128 are not illustrated to avoid detracting from the principles of the invention. Herein the particular type, and configuration, of endpoint computer systems 102A-102N, gateway computer system 130, and computer system 128 are not essential to the present invention.

FIG. 2 is a flow diagram of a method 200 for detecting hidden rootkit communication channels in accordance with one embodiment of the present invention. Referring now to FIGS. 1 and 2 together, in one embodiment of the invention, execution of gateway detection application 132 by processor 148 of gateway computer system 130 results in the operations of method 200 as described below. In one embodiment, method 200 is entered at an ENTER operation 202, and from ENTER operation 202, processing transitions to a GENERATE GATEWAY DATABASE operation 204.

In GENERATE GATEWAY DATABASE operation 204, a gateway database 134 (FIG. 1) is generated by gateway detection application 132. As further described herein with reference to FIG. 3, gateway database 134 includes entries associated with critical network events detected on network 136 by gateway detection application 132. Herein in one embodiment, a critical network event is an event that identifies a communication channel to/from an endpoint computer system 102A-102N.

In one embodiment, gateway detection application 132 includes a network sniffer application, e.g., network sniffer application 154, that detects critical network events on network 136 and records information associated with the critical network events. In other embodiments, gateway detection application 132 has access to a sniffer application or other application that detects critical network events on network 136. Sniffer applications that detect network events, including communications to/from ports on computer systems and ICMP messages from a port on a computer system, are well-known to those of skill in the art and are not further described herein to avoid detracting from the principles of the invention.

In one embodiment, gateway database 134 includes separate entries for each differently identified critical network event associated with an endpoint computer system 102A-102N, e.g., endpoint computer system 102A. In one embodiment, one entry is maintained in gateway database 134 for each differently identified critical network event.

Thus, in one embodiment, each entry in gateway database 134 for a critical network event includes an identifier that separately identifies the critical network event. For example, in one embodiment, an identifier includes the IP address and port number of a port on endpoint computer system 102A, i.e., the port address. In one embodiment, there is a single entry in gateway database 134 for ICMP messages. In one embodiment, each entry in gateway database 134 for a critical network event further includes a time stamp value representing the most recent time associated with the particular critical network event.

For example, in one embodiment, if a same-identified critical network transmission is detected multiple times by gateway detection application 132, a single entry is maintained in gateway database 134 associated with the critical network event and the time stamp value of the entry is updated to reflect the time associated with the most recently same-identified critical network event. In one embodiment, the time stamp value is the time present in a time stamp field of the network header of the data packet associated with the critical network event. However, in other embodiments, the time stamp value can be differently defined, such as the time the critical network event was entered in gateway database 134.

Thus, in operation 204, critical network events detected on network 136 and associated with an endpoint computer system, such as endpoint computer system 102A, are selectively listed in gateway database 134 for later comparison against critical endpoint events detected at the endpoint computer system, e.g., endpoint computer system 102A. A critical network event detected on the network, but not detected at the endpoint computer system, e.g., endpoint computer system 102A, is presumed indicative of a rootkit hidden communication channel. From GENERATE GATEWAY DATABASE operation 204, processing transitions to a RECEIVE ENDPOINT REPORT operation 206.

In RECEIVE ENDPOINT REPORT operation 206, gateway detection application 132 receives an endpoint report generated by an endpoint computer system 102A-102N, such as endpoint report 138 generated by endpoint computer system 102A. Although various operations are described herein with reference to endpoint computer system 102A for clarity of description, the operations are also applicable to endpoint computer systems 102B-102N. In one embodiment, endpoint report 138 is generated by endpoint detection application 102A from entries logged in an endpoint database 114 (FIG. 1). Generation of endpoint report 138 and endpoint database 114 are further described herein with reference to FIG. 4.

In one embodiment, each entry in endpoint database 114 includes separate entries for each differently identified critical endpoint event detected on the endpoint computer system, e.g., endpoint computer system 102A. In one embodiment, a single entry is maintained in endpoint database 114 for each differently identified critical endpoint event.

Thus, in one embodiment, each entry in endpoint database 114 for a critical endpoint event includes an identifier that separately identifies a communication channel to/from an endpoint computer system, e.g., endpoint computer system 102A. In one embodiment, an identifier includes the IP address and port number of a port on the endpoint computer system 102A, i.e., the port address.

In one embodiment, there is a single entry in endpoint database 114 for ICMP messages. In one embodiment, each entry in endpoint database 114 for a critical endpoint event further includes a time stamp value representing the most recent time associated with the particular critical endpoint event.

For example, in one embodiment, if a same-identified critical endpoint transmission is detected multiple times by endpoint detection application 106, a single entry is maintained in endpoint database 114 associated with the critical endpoint transmission and the time stamp value of the entry is updated to reflect the time associated with the most recently same-identified critical endpoint transmission.

In one embodiment, upon meeting a specified send threshold, endpoint detection application 106 generates endpoint report 138. In one embodiment, endpoint report 138 includes some or all of the entries in endpoint database 114. In one embodiment, the entry associated with ICMP messages is by default included in endpoint report 138.

Thus, in operation 206, critical endpoint events detected on endpoint computer system 102A are selectively sent in endpoint report 138 to gateway detection application 132 for later comparison against critical network events entered in gateway database 134. From RECEIVE ENDPOINT REPORT operation 206, processing optionally transitions to a SEND RECEIPT CONFIRMATION operation 208, or directly to a SELECT GATEWAY DATABASE ENTRY operation 210, if operation 208 is not performed.

In optional SEND RECEIPT CONFIRMATION operation 208, receipt of endpoint report 138 is returned to the sending endpoint computer system, e.g., endpoint computer system 102A. In one embodiment, the confirmation receipt is generated by gateway detection application 132. In one embodiment, this permits endpoint detection application 106 to clear the entries sent in endpoint report 138 from endpoint database 114. From optional SEND RECEIPT CONFIRMATION operation 208, processing transitions to a SELECT GATEWAY DATABASE ENTRY operation 210.

In SELECT GATEWAY DATABASE ENTRY operation 210, an entry in gateway database 134, also termed herein a gateway database entry is initially selected for comparison to entries in endpoint report 138. From SELECT GATEWAY DATABASE ENTRY operation 210, processing transitions to a MATCH ENDPOINT REPORT ENTRY check operation 212.

In MATCH ENDPOINT REPORT ENTRY check operation 212, the gateway database entry selected in operation 210 is compared to entries in endpoint report 138 to determine whether it corresponds to, e.g., matches, an entry in endpoint report 138. In one embodiment, the identifier in the gateway database entry is compared to identifiers of entries in endpoint report 138 until a match is found, i.e., the same identifier is matched, or until the gateway database entry has been compared to each of the entries in endpoint report 138, also termed herein endpoint report entries.

When a match is found ("YES"), both endpoint detection application 106 and gateway detection application 132 have detected a same-identified communication channel. Thus the communication channel is not hidden, and therefore presumed not indicative of a rootkit hidden communication channel, for example, a communication channel on port 140. From MATCH ENDPOINT REPORT ENTRY check operation 212, processing transitions to a REMOVE GATEWAY DATABASE ENTRY operation 214.

In REMOVE GATEWAY DATABASE ENTRY operation 214, the gateway database entry that matches an entry endpoint report 138 in check operation 212 is removed from gateway database 134. From REMOVE GATEWAY DATABASE ENTRY operation 214, processing transitions to a LAST GATEWAY DATABASE ENTRY check operation 216.

In LAST GATEWAY DATABASE ENTRY check operation 216, a determination is made whether the gateway database entry selected in operation 210, is the last gateway database entry in gateway database 134. When the gateway database entry selected in operation 210 is not the last gateway database entry in gateway database 134 ("NO"), additional entries in gateway database 134 remain to be evaluated and processing returns to SELECT GATEWAY DATABASE ENTRY operation 210, as earlier described, with selection of a next gateway database entry in gateway database 134.

Referring again to LAST GATEWAY DATABASE ENTRY check operation 216, alternatively, when the gateway database entry selected in operation 210 is the last gateway database entry in gateway database 134 ("YES"), additional entries in gateway database 134 do not remain to be evaluated as all the entries in gateway database 134 have been compared to endpoint report entries. From LAST GATEWAY DATABASE ENTRY check operation 216 processing returns to RECEIVE ENDPOINT REPORT operation 206 upon receipt of a next endpoint report. In some embodiments, rather than returning to operation 206, processing optionally exits method 200 at an EXIT operation (not shown).

Referring again to MATCH ENDPOINT REPORT ENTRY check operation 212, alternatively, when an entry in gateway database 134 does not match an entry in endpoint report 138 ("NO"), gateway detection application 132 has detected a communication channel that was not detected by endpoint detection application 106 at endpoint computer system 102A. Thus, the communication channel, for example, a communication channel on port 142, is assumed hidden from endpoint computer system 102A, and therefore presumed indicative of a rootkit hidden communication channel.

In one embodiment, the unmatched entry in gateway database 134 is automatically presumed indicative of a rootkit hidden communication channel and processing transitions from MATCH ENDPOINT REPORT ENTRY check operation 212 to a NOTIFY operation 220. In an optional embodiment, the unmatched entry in gateway database 134 is held for comparison to one or more subsequent endpoint reports and from MATCH ENDPOINT REPORT ENTRY check operation 212, processing optionally transitions to a HOLD THRESHOLD MET check operation 218.

In optional HOLD THRESHOLD MET check operation 218, the unmatched entry in gateway database 134 is evaluated to determine whether it meets a specified hold threshold. Herein a hold threshold is a parameter which when met indicates that an unmatched entry gateway database 134 is presumed indicative of a rootkit hidden communication channel. The parameter is, for example, in one embodiment, a time limit, or a number of endpoint report comparisons. In other embodiments, the parameter can be different.

In the present embodiment, it may occur that endpoint report 138 does not include all the critical endpoint events present in endpoint database 114, for example, due to an entry number limit, and that one or more successive endpoint reports may be required to determine with more surety whether the unmatched entry in gateway database 134 is not detected by endpoint detection application 106.

Thus, in one embodiment, the unmatched entry in gateway database 134 is retained on gateway database 134 to allow its comparison to subsequently received endpoint reports. In one embodiment, the time stamp associated with the unmatched entry in gateway database 134 is evaluated to determine whether the time stamp is earlier than a specified hold threshold of time.

For example, assume a time stamp of an unmatched entry gateway database 134 is 14:01:00 and the hold threshold is parameter of five (5) minutes. If the current time at comparison is 14:07:00, an unmatched entry in gateway database 134 having a time stamp earlier than 14:02:00 meets the hold threshold. Consequently, in this example, the unmatched entry in gateway database 134 with time stamp 14:01:00 meets the (5) minute hold threshold.

In another example, assume the same unmatched entry in gateway database 134 and the same current time of comparison, but the hold threshold is set for seven (7) minutes. Thus, an unmatched entry in gateway database 134 having a time stamp earlier than 14:00:00 meets the hold threshold. In this example, the unmatched entry in gateway database 134 with time stamp 14:01:00 does not meet the hold threshold. This permits the unmatched entry in gateway database 134 to remain on gateway database 134, and perhaps be cleared in a comparison with a subsequent endpoint report.

When the unmatched entry in gateway database 134 is determined not to meet the hold threshold ("NO"), the unmatched entry gateway database 134 remains in gateway database 134, and processing transitions from HOLD THRESHOLD MET check operation 218 to LAST GATEWAY DATABASE ENTRY check operation 216 as earlier described.

Referring again to HOLD THRESHOLD MET check operation 218, alternatively, when the unmatched entry in gateway database 134 is determined to have met the hold threshold ("YES"), the unmatched entry in gateway database 134 is presumed indicative of a rootkit hidden communication channel, and processing transitions from HOLD THRESHOLD MET check operation 218 to NOTIFY operation 220.

In NOTIFY operation 220, the user of endpoint computer system 102A (FIG. 1), and/or a system administrator of the network, e.g., network 136, are notified that a hidden communication channel is detected on endpoint computer system 102A. In one embodiment, gateway detection application 134 generates a record or error message to the user and/or system administrator.

In one embodiment, the notification identifies the particular port address being accessed. In one embodiment, the notification identifies that ICMP traffic is detected on the network that is not detected on an associated endpoint computer system 102A-102N, e.g., endpoint computer system 102A.

The user and/or administrator are notified using any one of a number of techniques, e.g., by using a pop up window, by generating an e-mail, by writing to a file and/or otherwise by logging the event. Further, in one embodiment, a notification is provided to a security center. From NOTIFY operation 220, processing optionally transitions to a TAKE PROTECTIVE ACTION operation 222, or directly to operation 214, as earlier described, if operation 222 is not performed.

In optional TAKE PROTECTIVE ACTION operation 222 protective action is taken. In one embodiment, the unmatched entry in gateway database 134 is saved to a file for investigatory purposes and/or sent to a security analysis center.

In one embodiment, the communications with the compromised endpoint computer system are aggressively monitored to allow the attacker to be identified or the attacker's technique to be documented. In some embodiments, by identifying the rootkit hidden communication channel, the compromised endpoint computer system is shut down or taken off network 136 to prevent further loss of information and to allow a security analysis of the endpoint computer system.

In one embodiment, the user is prompted for input prior to taking protective action, e.g., the user is asked for permission to take protective action. From optional TAKE PROTECTIVE ACTION operation 222, processing transitions to operation 214 as earlier described.

Figure 3:
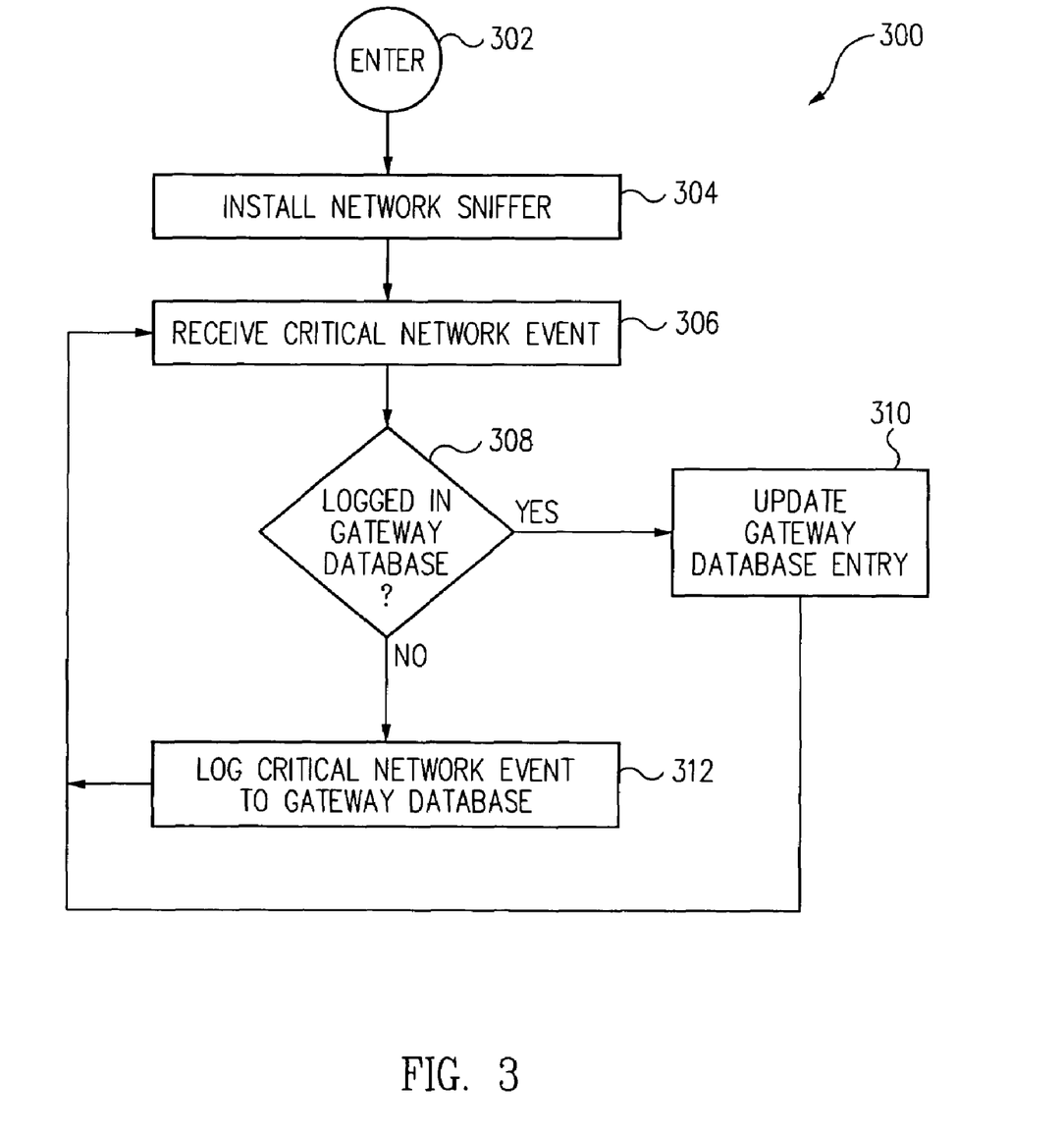
FIG. 3 illustrates a flow diagram of a method for generating a gateway database in accordance with one embodiment of the invention.

FIG. 3 illustrates a flow diagram of a method 300 for generating gateway database 134 in accordance with one embodiment of the invention. Referring now to FIGS. 1 and 3 together, in one embodiment of the invention, execution of gateway detection application 132 by processor 148 of gateway computer system 130 results in the operations of method 300 as described below. In one embodiment, method 300 is entered at an ENTER operation 302, and from ENTER operation 302, processing transitions to an INSTALL NETWORK SNIFFER operation 304.

In INSTALL NETWORK SNIFFER operation 304, gateway detection application 132 installs a network sniffer application, e.g., network sniffer application 154, on gateway computer system 130 that detects critical network events on network 136. Generally, a network sniffer is an application that examines network traffic and generates a copy of the data or portions of the data without redirecting or altering the data. Network sniffers are well known to those of skill in the art and are not further described herein to avoid detracting from the principles of the invention.

As earlier described, in one embodiment, a critical network event is an event that identifies a communication channel to/from an endpoint computer system 102A-102N. In one embodiment, a critical network event is a port connection made to one or more of endpoint computer systems 102A-102N, e.g., endpoint computer system 102A, over network 136, and/or an ICMP message sent from one or more of endpoint computer systems 102A-102N, e.g., endpoint computer system 102A, over network 136.

As earlier described, communications are typically routed on a network as a data packet, and each data packet includes a network header that includes information used in routing the data packet. In one embodiment, network sniffer application 154 detects critical network events and records information obtained from the network header of a critical network event and provides the information to, or it is accessible by, gateway detection application 132.

In one embodiment, the information includes the port address of the destination and/or source and the time stamp. In some embodiments, the information includes additional data such as the type of protocol, for example, ICMP, TCP/IP, or UDP. From INSTALL NETWORK SNIFFER operation 304, processing transitions to a RECEIVE CRITICAL NETWORK EVENT operation 306.

In RECEIVE CRITICAL NETWORK EVENT operation 306, a critical network event is detected by sniffer application 154 and the information associated with the critical network event, also termed herein critical network event information, is provided to gateway detection application 132. In one embodiment, when network sniffer application 154 detects a critical network transmission on network 136, e.g., a data packet, the critical network information is obtained from the network header and sent to gateway detection application 132.

In one embodiment, the critical network information includes an identifier, such as an IP address and port number, and a time stamp. In one embodiment, ICMP messages are assigned a specific identifier reserved for ICMP message traffic. From RECEIVE CRITICAL NETWORK EVENT operation 306, processing transitions to a LOGGED IN GATEWAY DATABASE check operation 308.

In LOGGED IN GATEWAY DATABASE check operation 308, a determination is made whether the critical network event received in operation 306 is already logged in gateway database 134. As earlier described, a single entry is maintained for each differently identified critical network event.

In one embodiment, gateway detection application 132 compares the identifier provided in the critical network information associated with the critical network event with identifiers of entries already present in gateway database 134, if any.

When the identifier of the critical network event matches an identifier of an entry already present in gateway database 134, a determination is made that the critical network event is already logged in gateway database 134 ("YES"), and processing transitions from LOGGED IN GATEWAY DATABASE check operation 308 to an UPDATE GATEWAY DATABASE ENTRY operation 310.

In UPDATE GATEWAY DATABASE ENTRY operation 310, in one embodiment, the previously logged gateway database entry is updated to reflect the time stamp of the current critical network transmission. From UPDATE GATEWAY DATABASE ENTRY operation 310, processing returns to operation 306 on receipt of a next critical network transmission.

Referring again to LOGGED IN GATEWAY DATABASE check operation 308, alternatively, when the identifier of the current critical network event does not match an identifier of an entry already present in gateway database 134, a determination is made that the critical network event is not logged ("NO") in gateway database 134. From LOGGED IN GATEWAY DATABASE check operation 308, processing transitions to a LOG CRITICAL NETWORK EVENT TO GATEWAY DATABASE operation 312.

In LOG CRITICAL NETWORK EVENT TO GATEWAY DATABASE operation 312, a new entry is created in gateway database 134 identifying the critical network event. In one embodiment, the entry in gateway database 134 includes the identifier and time stamp associated with the critical network event. From LOG CRITICAL NETWORK EVENT TO GATEWAY DATABASE operation 312, processing returns to operation 306 on receipt of a next critical network event. In some embodiments, rather than returning to operation 306, processing optionally exits method 300 at an EXIT operation (not shown).

Figure 4:
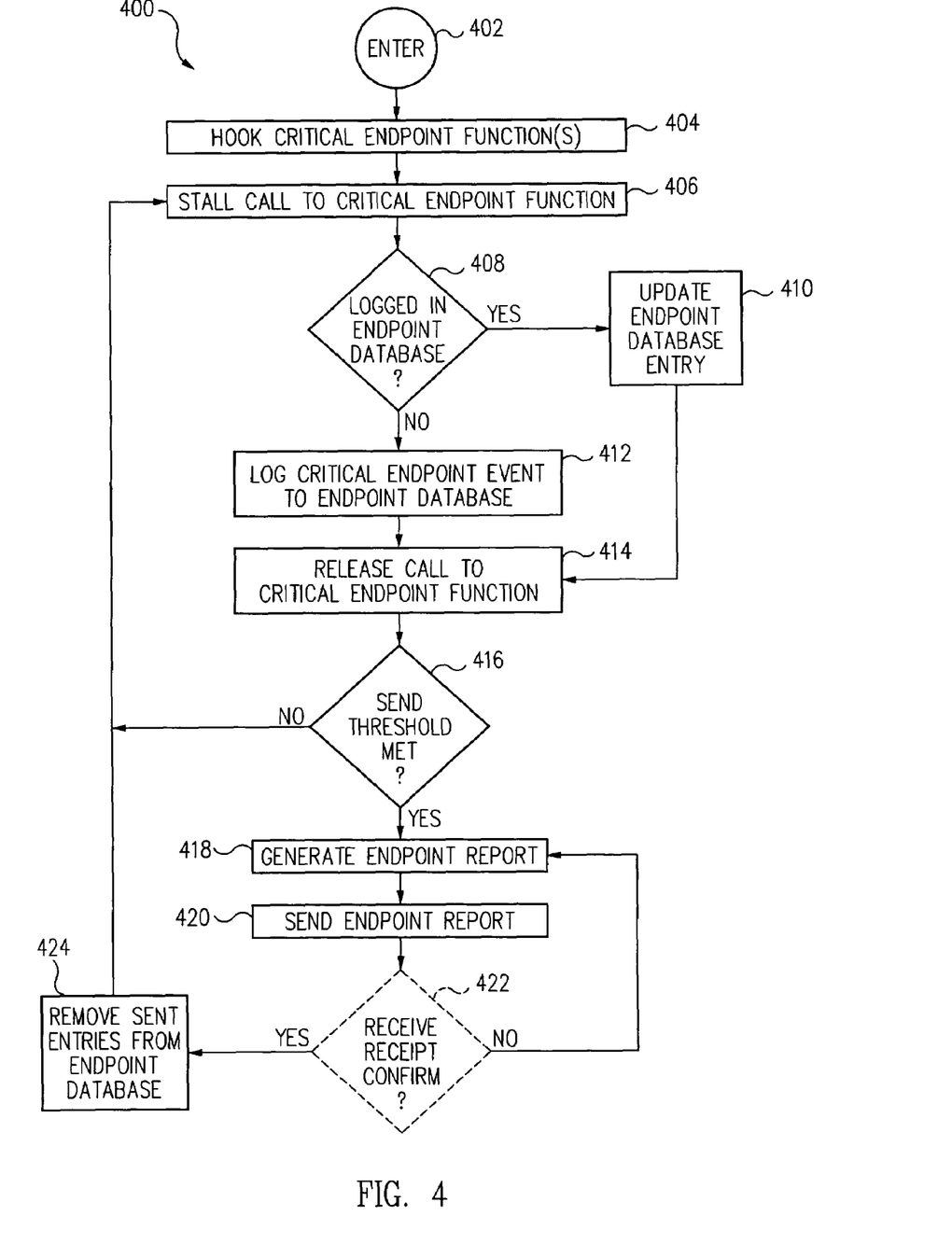
FIG. 4 illustrates a flow diagram of a method for generating an endpoint report in accordance with one embodiment of the invention.

FIG. 4 illustrates a flow diagram of a method 400 for generating endpoint report 138 in accordance with one embodiment of the invention. Referring now to FIGS. 1 and 4 together, in one embodiment, execution of endpoint detection application 106 by processor 108 of endpoint computer system 102A results in the operations of method 400 as described below. In one embodiment, method 400 is entered at an ENTER operation 402, and from ENTER operation 402, processing transitions to a HOOK CRITICAL ENDPOINT FUNCTION(S) operation 404.

In HOOK CRITICAL ENDPOINT FUNCTION(S) operation 404, critical endpoint functions are hooked on an endpoint computer system, e.g., endpoint computer system 102A. Herein, in one embodiment, a critical endpoint function is a function associated with a critical endpoint event. Herein in one embodiment, a critical endpoint event is an event that identifies a communication channel to/from an endpoint computer system 102A-102N, e.g., endpoint computer system 102A.

In one embodiment, a critical endpoint function includes the operating system function callable utilizing the LISTEN API command, herein termed the LISTEN function. In one embodiment, a critical endpoint function includes an operating system function callable utilizing the SEND API command, herein termed the SEND function. In one embodiment, a critical endpoint function includes an operating system function callable utilizing the SEND API command in which an ICMP message is indicated, such as by an appropriate flag in the call.

Hooking of functions can be performed utilizing a variety of hooking techniques. In one embodiment, endpoint detection application 106 is loaded into the memory of each process context. Endpoint detection application 106 hooks each critical endpoint function, for example in a WINSOCK API import address table associated with each process.

For example, in one embodiment, a LISTEN API entry in a WINSOCK API import table associated with a LISTEN function is modified so that a call to the LISTEN function is redirected to alternate code, such as a hook module of endpoint detection application 106. In one embodiment, a function pointer in the LISTEN API entry is modified to point to the hook module rather than the LISTEN function in the operating system. Hooking the call allows endpoint detection application 106 to obtain information about the associated critical endpoint event. From HOOK CRITICAL ENDPOINT FUNCTION(S) operation 404, processing transitions to a STALL CALL TO CRITICAL ENDPOINT FUNCTION operation 406.

In STALL CALL TO CRITICAL ENDPOINT FUNCTION operation 406, a call to a critical endpoint function is stalled. For example, in one embodiment, a call to a critical endpoint function, such as a LISTEN function or a SEND function, is stalled and prevented from continuing to the associated function in the operating system. From STALL CALL TO CRITICAL ENDPOINT FUNCTION operation 406, processing transitions to a LOGGED IN ENDPOINT DATABASE check operation 408.

In LOGGED IN ENDPOINT DATABASE check operation 408, a determination is made whether the critical endpoint event associated with the call stalled in operation 406 is already logged in endpoint database 114. In one embodiment, a single entry is maintained for each differently identified critical endpoint transmission.

In one embodiment, endpoint detection application 106 extracts an identifier associated with the critical endpoint event, such as a port address and compares the identifier with identifiers of entries already present in endpoint database 114, if any.

When the identifier of the critical endpoint event matches an identifier of an entry already present in endpoint database 114, a determination is made that the critical endpoint event is already logged in endpoint database 114 ("YES"), and processing transitions from LOGGED IN ENDPOINT DATABASE check operation 408 to an UPDATE ENDPOINT DATABASE ENTRY operation 410.

In UPDATE ENDPOINT DATABASE ENTRY operation 410, the previously logged endpoint database entry is updated to reflect the time stamp of the critical endpoint event. From UPDATE ENDPOINT DATABASE ENTRY operation 410, processing transitions to a RELEASE CALL TO CRITICAL ENDPOINT FUNCTION operation 414.

Referring again to LOGGED IN ENDPOINT DATABASE check operation 408, alternatively, when the identifier of the critical endpoint event does not match an identifier of an entry already present in endpoint database 114, a determination is made that the critical endpoint event is not logged in endpoint database 114 ("NO"). From LOGGED IN ENDPOINT DATABASE check operation 408, processing transitions to a LOG CRITICAL ENDPOINT EVENT TO ENDPOINT DATABASE operation 412.

In LOG CRITICAL ENDPOINT EVENT TO ENDPOINT DATABASE operation 412, a new entry is created in endpoint database 114 identifying the critical endpoint event. In one embodiment, the entry in endpoint database 134 includes the identifier and time stamp associated with the critical endpoint event.

In one embodiment, endpoint database 114 includes detections of critical endpoint events. Similar to gateway database 134, endpoint database 114 includes a single entry, herein termed an endpoint database entry for each differently identifiable critical endpoint event. In particular, in one embodiment, endpoint database 114 includes critical endpoint events associated with critical endpoint functions detected by endpoint detection application 106. From LOG CRITICAL ENDPOINT EVENT TO ENDPOINT DATABASE operation 412, processing transitions to RELEASE CALL TO CRITICAL ENDPOINT FUNCTION operation 414.

In RELEASE CALL TO CRITICAL ENDPOINT FUNCTION operation 414, the call to the critical endpoint function that was stalled in operation 406 is released and allowed to proceed to the associated operating system function. From RELEASE CALL TO CRITICAL ENDPOINT FUNCTION operation 414, processing a SEND THRESHOLD MET check operation 416.

In SEND THRESHOLD MET check operation 416, a determination is made whether to send an endpoint report to gateway detection application 132. Herein, in one embodiment, a send threshold is a parameter which when met indicates that an endpoint report is to be generated. In one embodiment, the parameter is, for example, a time limit or a number of entries in endpoint database 114.

For example, in one embodiment, if a send threshold is set to ten (10) entries, when a tenth entry is determined to be present in endpoint database 114, the send threshold is met and generation of endpoint report 138 is triggered. Otherwise, the send threshold is not met, e.g., ten entries are not present in endpoint database 114.

Thus, in one embodiment, upon a determination that the send threshold is not met ("NO"), for example, there are only eight (8) entries, endpoint report 138 is not generated, and from SEND THRESHOLD MET check operation 416, processing returns to operation 406 on receipt of a next call to a critical endpoint function.

Alternatively, in one embodiment, upon a determination that the send threshold is met ("YES"), for example, when a tenth entry is determined to be present in endpoint database 114, the send threshold is met and from SEND THRESHOLD MET check operation 416, processing transitions to a GENERATE ENDPOINT REPORT operation 418.

In GENERATE ENDPOINT REPORT operation 418, endpoint detection application 106 generates an endpoint report, e.g., endpoint report 138, based on some or all of the entries in endpoint database 114. In one embodiment, endpoint detection application 106 copies some or all of the entries from endpoint database 114 and formats the entries for sending to gateway detection application 132 as endpoint report 138.

In another embodiment, endpoint report 138 is generated in accordance with one or more default or user customizable parameters, such as number of entries or time, which result in the selective copying of entries from endpoint database 114 for inclusion in endpoint report 138. In one embodiment, a single entry associated with ICMP messages is by default included in endpoint report 138.

For example, if endpoint database 114 includes seventy five (75) entries and endpoint report 138 is limited, by a default parameter setting, to fifty (50) entries, the first fifty (50) entries of endpoint database 114 are extracted and reported in endpoint report 138.

In some embodiments, prior to shut down of endpoint computer system 102A, and independent of the send threshold, a final endpoint report is generated and sent to gateway detection application 134. In one embodiment, the final endpoint report further includes an indicator that signals to gateway detection application 134 that the endpoint report is a final endpoint report. Upon generation of the endpoint report, e.g., endpoint report 138, processing transitions from GEN- ERATE ENDPOINT REPORT operation 418 to a SEND ENDPOINT REPORT operation 420.

In SEND ENDPOINT REPORT operation 420, the endpoint report, e.g., endpoint report 138, is sent to gateway detection application 132. From SEND ENDPOINT REPORT operation 420, processing optionally transitions to a RECEIVE RECEIPT CONFIRM check operation 422, or directly to a REMOVE SENT ENTRIES FROM ENDPOINT DATABASE operation 424.

In optional RECEIVE RECEIPT CONFIRM check operation 422, endpoint detection application 106 determines whether a receipt confirmation is returned from gateway detection application 132. For example, in one embodiment, endpoint detection application 106 waits some specified amount of time from sending endpoint report 138. When a receipt confirmation is returned ("YES"), processing transitions from optional RECEIVE RECEIPT CONFIRM check operation 422 to REMOVE SENT ENTRIES FROM ENDPOINT DATABASE operation 424.

In REMOVE SENT ENTRIES FROM ENDPOINT DATABASE operation 424, entries in endpoint database 114 that were sent in endpoint report 138 are removed, or otherwise cleared from endpoint database 114. Thus, in one embodiment, entries sent in endpoint report 138 are automatically cleared from endpoint database 114 on sending of endpoint report 138. In another optional embodiment, entries sent in endpoint report 138 are not cleared from endpoint database 114 until receipt is confirmed by gateway detection application 132. From REMOVE SENT ENTRIES FROM ENDPOINT DATABASE operation 424, processing returns to operation 406 upon receipt of a next call to a critical endpoint function. In some embodiments, rather than returning to operation 406, processing optionally exits method 400 at an EXIT operation (not shown).

Referring again to optional RECEIVE RECEIPT CONFIRM check operation 422, alternatively, when a receipt confirmation is not returned ("NO"), processing transitions from RECEIVE RECEIPT CONFIRM check operation 442 and returns to operation 418 with another endpoint report being generated and sent to gateway detection application 132. In one embodiment, an error report is generated after a specified number of resends with no receipt confirm and processing exits method 400 at an EXIT operation (not shown).

Referring again to FIG. 1, in one embodiment of the invention, endpoint detection application 106 is stored in memory 112 and gateway detection application 132 is stored in memory 152. As used herein, a computer memory refers to a volatile memory, a non-volatile memory, or a combination of the two.

Although endpoint detection application 106 and gateway detection application 132 are referred to as applications, this is illustrative only. Endpoint detection application 106 and gateway detection application 132 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, endpoint detection application 106 and gateway detection application 132 are implemented in user mode.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, Internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, rootkit prevention application 106 may be stored in memory 152 that is physically located in a location different from processor 108. Processor 108 should be coupled to the memory 152. This could be accomplished in a client-server system, or alternatively via a connection to another computer via modems and analog lines, or digital interfaces and a digital carrier line.

More specifically, in one embodiment, endpoint computer systems 102A and/or gateway computer system 130 is a portable computer, a workstation, a two-way pager, a cellular telephone, a digital wireless telephone, a personal digital assistant, a server computer, an Internet appliance, or any other device that includes components that execute the functionality of endpoint detection application 106 and gateway detection application 132 in accordance with at least one of the embodiments as described herein. Similarly, in another embodiment, endpoint computer system 102A and/or gateway computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of endpoint detection application 106 and gateway detection application 132 in accordance with one embodiment of the present invention can be implemented in a wide variety of computer system configurations. In addition, the functionalities of endpoint detection application 106 and gateway detection application 132 could be stored as different modules in memories of different devices.

For example, endpoint detection application 106 could initially be stored in gateway computer system 130, and then as necessary, a portion of endpoint detection application 106 could be transferred to endpoint computer system 102A and executed on endpoint computer system 102A. Consequently, part of the functionality would be executed on processor 148 of gateway computer system 130, and another part would be executed on processor 108 of endpoint computer system 102A. In view of this disclosure, those of skill in the art can implement various embodiments of the present invention in a wide-variety of physical hardware configurations using an operating system and computer programming language of interest to the user.

In yet another embodiment, endpoint detection application 106 is stored in memory 152 of gateway computer system 130. Endpoint detection application 106 is transferred over network 136 to memory 112 in endpoint computer system 102A. In this embodiment, network interface 146 and I/O interface 110 would include analog modems, digital modems, or a network interface card. If modems are used, network 136 includes a communications network, and endpoint detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:

generating a gateway database on a gateway computer system connecting a first network to a second network, said gateway database including one or more gateway database entries, each of said one or more gateway database entries including an identifier, said identifier identifying a communication channel detected on said first network with an endpoint computer system;

receiving an endpoint report, generated on said endpoint computer system, said endpoint report including one or more endpoint report entries, each of said one or more endpoint report entries including an identifier, said identifier identifying a communication channel detected on said endpoint computer system connected to said first network;

selecting a gateway database entry in said gateway database;

determining whether said identifier in said gateway database entry matches an identifier in one of said one or more endpoint report entries; and sending a notification identifying said communication channel identified by said identifier in said gateway database entry as a hidden communication channel on said endpoint computer system upon said determining finding said identifier in said gateway database entry does not match an identifier in one of said one or more endpoint report entries, and removing said gateway database entry from said gateway database following said sending; and removing said gateway database entry from said gateway database upon said determining finding said identifier in said gateway database entry matches an identifier in one of said one or more endpoint report entries so that said communication channel identified by said identifier in said gateway database entry is not a hidden communication channel.

2. The computer implemented method of claim 1 further comprising:

taking protective action with respect to said hidden communication channel.

3. The computer implemented method of claim 1 further comprising:

waiting for receipt of a next endpoint report upon a determination that said gateway database entry is said last gateway database entry in said gateway database; and selecting a next gateway database entry from said gateway database upon a determination that said gateway database entry is not said last gateway database entry in said gateway database.

4. The computer implemented method of claim 1 further comprising:

performing said sending after a hold threshold is met for said determining.

5. The computer implemented method of claim 4 further comprising:

waiting for receipt of a next endpoint report upon a determination that said gateway database entry is said last gateway database entry in said gateway database and said hold threshold is not met; and selecting a next gateway database entry from said gateway database upon a determination that said gateway database entry is not said last gateway database entry in said gateway database and said hold threshold is not met.

6. The computer implemented method of claim 1 wherein said identifier in said gateway database entry is a port address, and further wherein said identifier in said endpoint report entry identifies a port address.

7. The computer implemented method of claim 1 wherein said identifier in said gateway database entry identifies an ICMP message and, further wherein said identifier in said endpoint report entry identifies an ICMP message.

8. The computer implemented method of claim 1 comprising:

stalling a call to a critical endpoint function on an endpoint computer system, said call including an identifier, said identifier identifying a communication channel detected on said endpoint computer system;

logging said communication channel as an entry in an endpoint database, said entry in said endpoint database including said identifier;

releasing said call to said critical endpoint function;

determining whether a send threshold is met wherein said send threshold is a parameter which indicates when an endpoint report is to be generated;

generating an endpoint report including one or more entries in said endpoint database upon said determining finding that said send threshold is met wherein said one or more entries are used in detecting any hidden rootkit communication channels on said endpoint computer system;

sending said report following said generating; and stalling a call to a next critical endpoint function upon said determining finding that said send threshold is not met.

9. The computer implemented method of claim 8 further comprising:

determining whether said endpoint report was received; and removing said entries sent in said endpoint report from said endpoint database upon said determining finding said endpoint report was received.

10. The computer implemented method of claim 9 further comprising:

generating said endpoint report upon said determining finding that said endpoint report was not received; and resending said endpoint report.

11. A computer system for detecting hidden rootkit communication channels on an endpoint computer system, said endpoint computer system connected to a gateway computer system by a network, the system comprising:

an endpoint detection application located on said endpoint computer system, wherein said endpoint detection application generates an endpoint database and an endpoint report including entries from said endpoint database, and transmits said endpoint report; and a gateway detection application located on said gateway computer system wherein said gateway detection application, upon receiving said endpoint report, processes said endpoint report to detect any hidden rootkit communication channels on said endpoint computer system wherein said processing said endpoint report comprises:

receiving said endpoint report selecting a gateway database entry in a gateway database wherein said gateway database entry includes an identifier identifying a communication channel detected on a first network with said endpoint computer system;

determining whether said identifier in said gateway database entry matches an identifier in one of said one or more endpoint report entries; and sending a notification identifying said communication channel identified by said identifier in said gateway database entry as a hidden rootkit communication channel on said endpoint computer system upon said determining finding said identifier in said gateway database entry does not match an identifier in one of said one or more endpoint report entries;

removing said gateway database entry from said gateway database following said sending; and removing said gateway database entry from said gateway database upon said determining finding said identifier in said gateway database entry matches an identifier in one of said one or more endpoint report entries so that said communication channel identified by said identifier in said gateway database entry is not a hidden rootkit communication channel.

12. The computer system of claim 11 wherein said gateway detection application further comprises:

a sniffer application.

13. The computer system of claim 11 wherein said endpoint database includes entries of critical endpoint events, and further wherein said gateway detection application generates a gateway database including entries of critical network events.

14. A computer system comprising:

an endpoint computer system comprising:

an endpoint detection application, said endpoint detection application for detecting critical endpoint events on said endpoint computer system; and a gateway computer system connected by a network to said endpoint computer system, said gateway computer system further comprising:

a gateway detection application wherein said gateway detection application, upon receiving said endpoint report, processes said endpoint report to detect any hidden rootkit communication channels on said endpoint computer system wherein said processing said endpoint report comprises:

receiving an endpoint report from said endpoint computer system;

selecting a gateway database entry in a gateway database wherein said gateway database entry includes an identifier identifying a communication channel detected on a first network with said endpoint computer system;

determining whether said identifier in said gateway database entry matches an identifier in one of said one or more endpoint report entries; and sending a notification identifying said communication channel identified by said identifier in said gateway database entry as a hidden rootkit communication channel on said endpoint computer system upon said determining finding said identifier in said gateway database entry does not match an identifier in one of said one or more endpoint report entries;

removing said gateway database entry from said gateway database following said sending; and removing said gateway database entry from said gateway database upon said determining finding said identifier in said gateway database entry matches an identifier in one of said one or more endpoint report entries so that said communication channel identified by said identifier in said gateway database entry is not a hidden rootkit communication channel.

* * * * *